Figure 1:
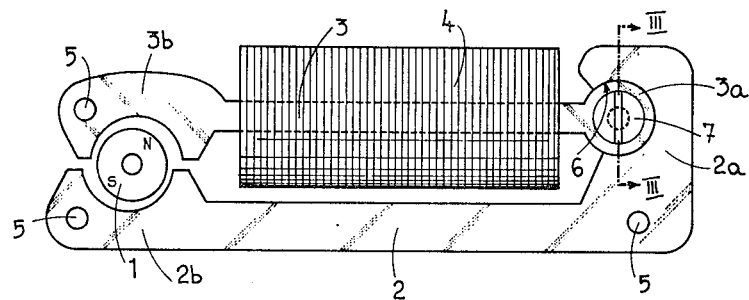
Figure 2:
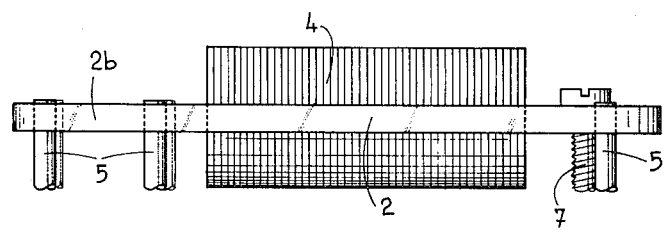
Figure 3:
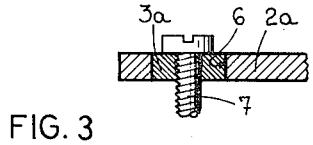
Figure 4:
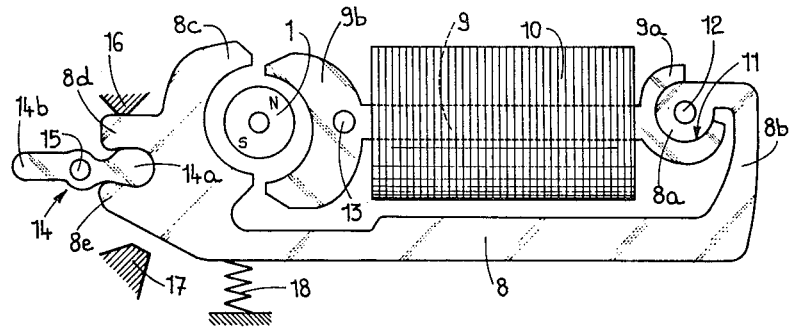

United States Patent [19]

Paratte

[11] 4,324,992
[45] Apr. 13, 1982

[54] ELECTROMAGNETIC MOTOR

[75] Inventor: Daniel Paratte, Neuchatel, Switzerland

[73] Assignee: Fabrique d'Horlogerie de Fontainemelon, Neuchatel, Switzerland

[21] Appl. No.: 145,680

[22] Filed: May 1, 1980

[30] Foreign Application Priority Data

May 11, 1979 [CH] Switzerland .......................... 4400/79

[51] Int. Cl.$^3$ ............................................ H02K 37/00
[52] U.S. Cl. .................................. 310/49 R; 310/162
[58] Field of Search ................ 310/156, 162, 165, 49, 310/42; 368/160, 76

[56] References Cited

U.S. PATENT DOCUMENTS

| | | | |
|---|---|---|---|
| 2,435,911 | 2/1948 | Van der Woude | 310/163 |
| 3,521,098 | 7/1970 | Jesse | 310/163 |
| 3,878,414 | 4/1975 | Harakawa | 310/156 |
| 4,095,130 | 6/1978 | Oshima et al. | 310/162 |
| 4,262,223 | 4/1981 | Cleusix | 310/49 |
| 4,277,704 | 7/1981 | Giger et al. | 310/49 |

*Primary Examiner*—Donovan F. Duggan
*Attorney, Agent, or Firm*—Silverman, Cass & Singer, Ltd.

[57] ABSTRACT

An electromagnetic stepping motor has a stator assembly comprising two pieces. These two pieces are assembled to each other by a protrusion of cylindrical shape of one of the pieces which engages in a recess, of corresponding shape, in an extension of the other piece. The two pieces, which are of elongated general shape, are disposed parallel to each other with said one piece constituting the core of an energizing coil of the motor. The coil can be wound directly on to the piece of the stator constituting the core of the coil.

5 Claims, 4 Drawing Figures

ELECTROMAGNETIC MOTOR

BACKGROUND OF THE INVENTION a. Field of the invention

The present invention relates to a stepping electromagnetic motor of the type having a stepping rotor, and a stator which is made of at least two pieces.

b. Description of the Prior Art

The known electromagnetic motors of the above mentioned type comprise, most usually, a core passing through an energizing coil of the motor. This core is terminated at each of its ends by an ear-shaped portion. On each ear-shaped portion there is secured a corresponding end of one of the two other pieces of the stator. Each of the two other pieces of the stator terminates, at its opposite end, in an enlarged pole face.

This arrangement has the drawback that all the pieces of the stator are not in the same plane. In other words, the axis of the core of the coil of the motor, that is to say the axis of the coil, is not situated in the median plane of the stator. Moreover, a good contact is not always achieved between the ears of the core and the secured ends of the two other pieces of the stator, a gap or interface often subsisting between the two contact surfaces.

SUMMARY OF THE INVENTION

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

BRIEF DESCRIPTION OF THE DRAWINGS

FIG. 1 is a plan view of a first embodiment of an electromagnetic motor having a stepping rotor.

FIG. 2 is an elevational view thereof.

FIG. 3 is a sectional view of a detail taken along the line III—III of FIG. 1, and FIG. 4 is a plan view of a second embodiment of an electromagnetic motor having a stepping rotor.

DESCRIPTION OF THE PREFERRED EMBODIMENTS

The stepping motor illustrated in FIGS. 1 and 2 comprises a rotor 1 made of a permanent magnet and magnetized diametrically with respect to the rotation axis of the rotor. The motor stator is constituted by two pieces 2 and 3, both of elongated shape and arranged side by side in mutually parallel disposition. The piece 3 constitutes the core of the energizing coil 4 of the motor.

The piece 2 is a traversed by two feet 5, each situated in the vicinity of one of its ends and serving to secure and to position the piece 2 on a frame, which is not shown, for instance on the frame of a clockwork or module. The piece 3 is assembled to the piece 2 by a protrusion 3*a*, of generally cylindrical shape. Protrusion 3*a* is engaged in a recess 6 of corresponding shape provided by an extension 2*a* of the piece 2. This protrusion 3*a* is provided with a central hole through which passes a screw 7 maintaining the heightwise location of said protrusion. The piece 3 at 3*b* is moreover traversed by a securing foot 5 determining its orientation relative to the piece 2.

This manner of assembly of the two pieces 2 and 3 of the stator of the motor has the advantage of enabling the relative position of these two pieces to be determined with a high degree of accuracy. The two pieces are in the same plane, the plane in which is situated the axis of the coil 4. Moreover, owing to their circular form, the surfaces in contact are perfectly engaged without there being any appreciable gap between them. Finally, the two pieces 2 and 3 can be manufactured very cheaply, by a cutting and stamping operation.

At their opposite ends, remote from the protrusion 3*a* and recess 6, the two pieces 2 and 3 of the stator are each terminated by an enlarged pole face 2*b* or 3*b*, between which the rotor 1 rotates.

It is to be noted that, owing to the shape of the piece 3 of the stator, which has, at its two ends, only protrusions 3*a* and 3*b* which are of little consequence, it is possible to wind the coil 4 directly on the piece 3. One could alternatively, in cases where the protrusion 3*a* is sufficiently small, construct the coil 4 separately and independently from its core, then position the coil 4 on the piece 3 by passing it over the protrusion 3*a* thereof.

The motor represented in FIG. 4 also comprises a rotor 1, as in the first embodiment. The stator of this motor is made of two pieces 8 and 9, which are elongated and arranged mutually parallel, the piece 9 carrying the coil 10 of the motor. The piece 9 is terminated by an ear 9*a* which provides a cylindrical recess 11, having a central axis, receiving a protrusion of corresponding shape 8*a* which terminates an extension 8*b* of the piece 8.

The enlarged pole faces of the two pieces 8 and 9 of the stator, between which the rotor 1 rotates, are designated by reference numerals 8*c* and 9*c*, respectively.

Whereas, in the first embodiment, the two stator pieces 2 and 3 are secured relatively to each other, after their assembled, relative position has been determined precisely, the piece 8 of the stator is movable with respect to the piece 9 in the embodiment of FIG. 4. As a matter of fact, the protrusion 8*a* of this piece 8 is traversed by a foot 12, securing the motor to the frame of an associated movement and around which the piece 8 can rotate. So far as the piece 9 is concerned, it is stationary, being fixedly positioned on the one hand by the protrusion 8*a* of the piece 8 and, on the other hand, by a securing foot 13.

The enlarged pole face 8*c* of the piece 8 is provided with a fork-shaped portion, formed of two arms 8*d* and 8*e*, between which is engaged one arm, designated by reference numeral 14*a*, of a two-armed lever 14 articulated at 15 on the frame of the movement. One can act on the second arm, designated by reference numeral 14*b*, of this lever 14 to bring the piece 8 into one or the other of two stable positions. In one of these positions, piece 8 bears, by its fork arm 8*d*, against a stationary abutment member 16 (position shown in FIG. 4), and in the other of these positions piece 8 bears by its fork arm 8*e* against a stationary abutment member 17. Each of these two positions corresponds to particular direction of rotation of the rotor 1. A spring 18 acts to yieldably maintain the piece 8 of the stator in the normal position shown in the drawing.

The reversal of the direction of rotation of the rotor can be useful when the motor is used in a timepiece where the user wants to modify the indicated time of a number of time zones by putting back the time indicated by the clock clock.

It is to be noted that the position of the abutment members 16 and 17 could also be adjustable, which would provide for the making of a fine adjustment in the eccentricity of the enlarged pole faces 8c and 9b with respect to the axis of rotation of the rotor 1.

The general shape of each of the two motors disclosed and represented in very elongated which, when they are used in timepieces, enables them to be placed between the supply battery and the periphery of the movement, in other words beyond the battery with respect to the center of the movement.

It is also to be noted that the securing means of the pieces of the stator described and illustrated could also be applied to the assembling of stators made of three pieces, of the general type of the known motors previously mentioned. In this case the core of the coil could present, at its ends, two cylindrical protrusions respectively closely engaged in recesses of corresponding shape presented by the two other pieces of the stator.

What I claim is:

1. An electromagnetic stepping motor, comprising a stepping rotor, and a stator which is made of at least two pieces assembled each to the other, one of said pieces presenting a protrusion of a general cylindrical shape and the other of said pieces presenting a recess of a shape corresponding to that of said protrusion, with said protrusion being engaged in said recess to maintain the assembly of said pieces, the two pieces being dimensioned to provide for rotation of the two pieces around the central axis of the protrusion.

2. An electromagnetic stepping motor according to claim 1, wherein said two pieces of the stator are both of elongated shape and are arranged side by side in mutually parallel disposition, at adjacent ends thereof one of the pieces providing said protrusion and the other of said pieces presenting said recess of corresponding shape and, at their opposite ends, each of said pieces having an enlarged pole face.

3. An electromagnetic stepping motor according to claim 2, wherein one of the said elongated pieces constitutes a core for an energizing coil of the motor.

4. An electromagnetic motor according to claim 1, wherein the relative position of said two pieces of the stator is adjustable by rotation of said cylindrical protrusion presented by said one of the pieces in said recess of corresponding shape presented by said other one of the pieces.

5. An electromagnetic stepping motor according to claim 1, wherein said one piece and said other piece of the stator provide two of three pieces which together constitute the stator of the motor and one of them passes through and provides a core of an energizing coil of the motor, the other of said three pieces being assembled with that one of said two pieces which provides said core in a similar manner to that by which said two pieces are relatively assembled by means of a cylindrical protrusion engaging in a correspondingly shaped recess.

* * * * *